(12) United States Patent  
Rosen

(10) Patent No.: US 7,232,075 B1  
(45) Date of Patent: Jun. 19, 2007

(54) THERMOSTAT SYSTEM WITH TOUCHSCREEN WITH USER INTERFACES OR OPERATIONAL ALGORITHMS VIA A REMOTE CORRESPONDENT

(76) Inventor: Howard Rosen, 5756 Royalmount Avenue, Montreal, Quebec H4P 1K5 (CA)

( * ) Notice: Subject to any disclaimer, the term of this patent is extended or adjusted under 35 U.S.C. 154(b) by 290 days.

(21) Appl. No.: 11/039,180

(22) Filed: Jan. 19, 2005

Related U.S. Application Data

(63) Continuation-in-part of application No. 10/440,474, filed on May 15, 2003, now Pat. No. 7,050,026.

(51) Int. Cl.
*G05D 23/00* (2006.01)
*G09G 3/36* (2006.01)

(52) U.S. Cl. .............................. 236/51; 236/94; 345/87; 345/102

(58) Field of Classification Search .................. 236/51, 236/94; 62/126; 165/11.1; 345/87, 94, 345/98, 99, 100, 101, 102, 211
See application file for complete search history.

(56) References Cited

U.S. PATENT DOCUMENTS

| 5,816,492 | A | 10/1998 | Charles et al. | |
|---|---|---|---|---|
| 6,424,872 | B1 | 7/2002 | Glanzer et al. | |
| 6,564,056 | B1 | 5/2003 | Fitzgerald | |
| 6,851,621 | B1* | 2/2005 | Wacker et al. | 236/51 |
| 7,055,759 | B2* | 6/2006 | Wacker et al. | 236/51 |
| 2006/0283965 | A1* | 12/2006 | Mueller et al. | 236/51 |
| 2007/0057079 | A1* | 3/2007 | Stark et al. | 236/51 |

* cited by examiner

*Primary Examiner*—Marc Norman  
(74) *Attorney, Agent, or Firm*—Marc E. Hankin; Hankin Patent Law, APC

(57) ABSTRACT

A thermostat system includes a temperature sensor, an LCD for selectively displaying alphanumeric and graphic devices on a touchscreen with virtual buttons, a processor having a memory for storing program and data information, and means for establishing communication with a remote correspondent. In one embodiment, the communication from the remote correspondent includes functional programming adding functions or virtual buttons to the thermostat not previously available to it. A communications interface connects the processor and a remote correspondent which is a source of functional programming.

20 Claims, 7 Drawing Sheets

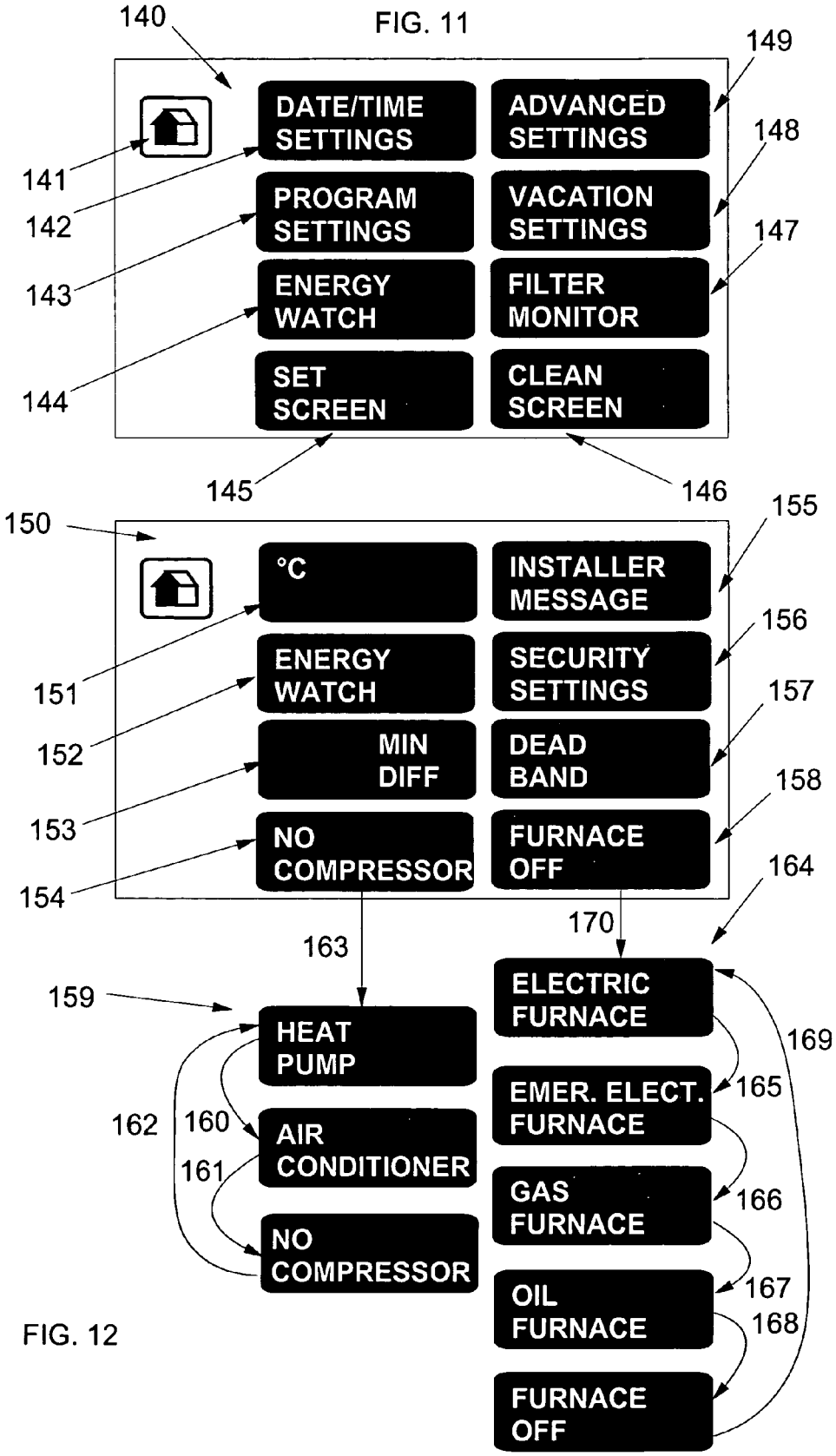

THERMOSTAT SYSTEM WITH TOUCHSCREEN WITH USER INTERFACES OR OPERATIONAL ALGORITHMS VIA A REMOTE CORRESPONDENT

This application is a continuation in part of U.S. patent application Ser. No. 10/440,474, filed May 15, 2003 now U.S. Pat. No. 7,050,026.

FIELD OF THE INVENTION

This invention relates to the art of thermostats and, more particularly, to a thermostat system incorporating a communication interface for receiving functional programming from a remote correspondent. In an extended version, this invention relates to a thermostat system for receiving functional programming which causes a change in a display of a thermostat with a touch sensitive screen as part of a user interface.

BACKGROUND OF THE INVENTION

Thermostats have been used for many years as a temperature sensitive switch which controls heating and/or cooling equipment for conditioning a space in which the thermostat, or a temperature sensor connected to the thermostat, is placed. In the well known manner, a simple thermostat can be adjusted to establish a temperature set point such that, when the temperature in the conditioned space reaches the set point, the thermostat interacts with the heating and/or cooling equipment to take suitable action to heat or cool the conditioned space as may be appropriate for the season.

Modern thermostat systems, which take advantage of the ongoing rapid advances in electronic technology and circuit integration, have many features which provide more precise supervision of the heating and/or cooling equipment to achieve more economical and more comfortable management of the temperature of a conditioned space. Many modern thermostat systems include a real time clock, a memory and a data processor to run a process control program stored in the memory to accurately measure the temperature of a temperature sensor disposed in the conditioned space and to send control signals to the heating and/or cooling equipment to closely control the temperature of the conditioned space. Modern thermostat systems permit anticipating and minimizing hysteresis or overshoot of the temperature in the conditioned space. In addition, the program can specify different set points at different times of the day and week and may also include a "vacation" mode which employs different set points when the conditioned space is not occupied for an extended period.

Many modern thermostat systems are programmable by a user. Typically, prior art programmable thermostat system employ a tactile touch pad with various fixed position buttons to be touched in a precise sequence to program set points (which may vary with the day of the week) for programmable time periods which may include a vacation mode. The programming sequence may be followed on a separate display, typically a liquid crystal display.

Outside of the art of programmable thermostat systems and programmable thermostats, dot matrix LCDs, which have pixel display elements arranged in rows and columns, are widely used. Dot matrix LCDs are not common as user-visible displays on programmable thermostats for viewing alphanumeric and iconic graphic information although such a thermostat is disclosed in, and particular features claimed in, co-pending U.S. patent application Ser. No. 10/440,474, filed May 15, 2003, and entitled: "Reverse Images in a Dot Matrix LCD for an Environmental Control Device" by Howard B. Rosen, incorporated by reference herein.

This limited use of dot matrix LCDs in programmable thermostats is because of basic engineering and practical considerations. Displayed information for a programmable thermostat generally includes such things as environmental conditions, heating and/or cooling equipment operation or non-operation, operational modes of the thermostat and the like. The most important information in thermostat displays is capable of being formed from segmented alphanumeric characters on less expensive LCDs without dot matrix capability and with reduced requirements for memory and programming.

Thus, dot matrix LCDs have not been widely used in prior art user programmable thermostats through a failure to understand an extended functionality capability of those devices when dot matrix LCDs are employed with a touch pad to effect an interactive display. This extended functionality is exploited to advantage in the present invention both to greatly simplify user programming and to relieve the manufacturer of the necessity to fabricate variants of the thermostat to suit the control and display aspects of various heating and/or cooling environments.

It is well known that information or operational interfaces of programmable thermostats can be incomprehensible or overly challenging to many users with advanced age, learning skills, poor vision and others in similar circumstances. Devices such as programmable thermostats, desktop computers, programmable VCR's, and even programmable clock radios often lie un-used in an owner's home because of fear of the complexity of such devices. More specifically, programmable thermostats generally comprise a user interface that use a mixture of raised push buttons with representations of environmental sensor information and control data on a segmented liquid crystal display.

In a modern programmable thermostat, a user is most often challenged with a first set of push buttons that lie outside of hinged cover and a second set of buttons that lie behind that hinged cover. External push buttons are usually those that a user will most often use to make simple program changes while the covered push buttons are lesser used buttons representing lesser used and usually more complex programming options. A user cannot by intuition selectively pick which push buttons represent thermostat program functions that are critical to a user and which buttons are of little consequence.

Some modern thermostat systems incorporate a touch sensitive screen which incorporate representations of buttons which a user may press as part of an interface with the thermostat system. While changing pressure sensitive buttons of a user interface from their more typical spring biased, mechanical form to a more convenient display-located representation, our knowledge of improvements in user interfaces and thermostat system equipment changes and control options are continuously evolving. At a particular moment in time, a form of a user interface may best suit a user's needs and incorporate modern equipment options. However, the day always arrives when an improved user interface is conceived or space conditioning equipment is improved, where either or both require a change in the thermostat system and/or user interface. Thermostats have in the past had very limited ability to be upgraded due to downward price pressure in the marketplace and the practical limitations of a user's lack of inclination to learn a sophisticated interface. A personal computer can accommodate many new programs and functions with its standardized user interface but is inconvenient, too large, and too costly for wall mounting typical of a modern thermostat.

There is a need for a programmable thermostat whose user interface can be easily changed after installation to accommodate equipment or control options not anticipated at installation or to change the user interface to a form not possible with a control program originally installed with the thermostat.

SUMMARY OF THE INVENTION

The invention comprises a programmable thermostat capable of receiving functional programming from a remote correspondent or removable media so that representations of information or touch sensitive buttons on a liquid crystal display are changed from those available to the thermostat before said receipt of functional programming. A user may quite easily download such functional programming from a remote correspondent to implement through a control program of the programmable thermostat one or more new, improved or desired user interfaces. The interfaces can be changed partly or entirely, and may be changed to coordinate its colors or designs to those of its surroundings.

A dot matrix liquid crystal display operable with the programmable thermostat and enabled with a touch pad in at least a portion of the display is substantially a "blank slate" upon which new user interfaces may be added by a user after an original installation of the thermostat. In the prior art, programmable thermostats have been installed with pre-programmed user interfaces comprising displays of text and graphic devices with input buttons that could not be upgraded or changed after purchase. Upgrades or changes in space conditioning equipment made after installation of such prior art thermostats required that the user have purchased a thermostat that would allow the upgrade or change. It is typical that a user now purchase a new thermostat if they desire a different user interface, desire a new control function, or install new space conditioning equipment. The present invention allows a user to obtain and select from multiple user interfaces and/or control functions associated with them which were not part of a control program at an original installation of their programmable thermostat.

A programmable thermostat system for controlling space conditioning equipment according to the invention includes: a transparent touch pad juxtaposed over a liquid crystal display to constitute a touch screen for interactive interface with a user; a temperature sensor for providing an electrical signal indicative of the temperature of a conditioned space; and a processor including: a central processing unit; a real time clock; a memory coupled to the central processing unit for storing program and data information; and an input/output unit coupled between the processor and said touch screen for carrying out information transfer therebetween. A control program stored in the memory directs the central processing unit to communicate through the input/output unit to selectively: establish on the liquid crystal display a representation of at least one button at a predetermined XY position; read the same XY position on the touch pad to determine if the "button" has been touched; and if the button has been touched, perform a predetermined action such as moving to a different menu or changing operating criteria. Preferably, an alphanumeric message explaining the function of the button is also displayed, and icon indicators may be employed to unmistakably associate a message with a button. Different menus can place the buttons and messages in various positions on the touch screen to facilitate intuitive programming.

In addition, a thermostat system according to the invention includes: a communications interface is adapted to establish bi-directional communications (via the Internet or some other suitable facility) between the processor and a remote correspondent. The remote correspondent is a source of functional programming which in part changes or adds to one or more previous functions of the control program or representations of virtual buttons on the display.

One type of change or addition within the objects of this invention relate to representations or locations of touch pad buttons of the user interface displayed on the liquid crystal display or of displays of text or graphic devices which form a part of a display. A user may desire that a touch pad button associated with the text "COOL" be changed to the text "AC" for air conditioning. A user may desire that a touch pad button associated with the word "FAN" be replaced with a graphic representation of fan blades connected to a central hub indicating fan function. A user may desire to obtain from a remote correspondent weather information about their locality and have it displayed in some manner on their liquid crystal display. A user may desire that certain touch pad buttons currently aligned vertically be aligned horizontally, diagonally or placed in any manner across the liquid crystal display. A user may desire some change or addition to the location, size or other such aspect of text or graphic devices viewable on the liquid crystal display. A user may desire a more aesthetically pleasing look or additional functions. Even though such functions were not part of the control program at an original installation of the thermostat, the user may initiate bi-directional communication with a remote correspondent and download functional programming to implement these new functions. Such communications may be established with removable media, infrared link, etc.

Another type of change or addition within the objects of this invention relate to functions of the control program associated with input indicating that a user has pressed a representation of a button on the touch pad and any legend on the LCD associated with that button. A user may desire a new control function for their thermostat which imposes a requirement of input of a password before changes to operating setpoints may be made. A user may desire a new control function for their thermostat where an existing heat pump be activated at a sensed temperature closer to the setpoint than a sensed temperature that would activate an existing electric furnace. A user may add a variable speed compressor to their existing heat pump system after original installation of the thermostat, where the thermostat originally comprised means for control connections for that variable speed compressor. Even though the preceding were not functions of the control program at an original installation of the thermostat, the user may initiate communication with a remote correspondent and download functional programming to accomplish these changes. The remote correspondent may originate transfer functional programming to the invention thermostat.

Periodically, or on demand if provided for, the control program stored in the memory causes the CPU to selectively: establish communications with the remote correspondent, copy functional programming, store the functional programming and adapt the control program to incorporate the functional programming.

In a variant embodiment, the remote correspondent provides a service sending, periodically or on demand, predetermined functional programming incorporated into the control program. The user of the thermostat may also selectively choose and even purchase aftermarket functions to the thermostat from a menu or perhaps a webpage.

DESCRIPTION OF THE DRAWING

FIG. 11 is an exemplary pictorial of a menu displayed on the touch screen of FIG. 9 to provide a first set of menu selections including an "ADVANCED SETTINGS" virtual button after functional programming has been obtained from a remote correspondent and the control program has incorporated and operated said functional programming.

FIG. 12 is an exemplary pictorial of another interactive interface displayed on the touch screen of FIG. 9 showing "ADVANCED SETTINGS" menu selections after the "ADVANCED SETTINGS" virtual button of FIG. 11 has been touched after functional programming has been obtained from a remote correspondent and the control program has incorporated and operated said functional programming.

DESCRIPTION OF THE PREFERRED EMBODIMENT(S)

Figure 1:
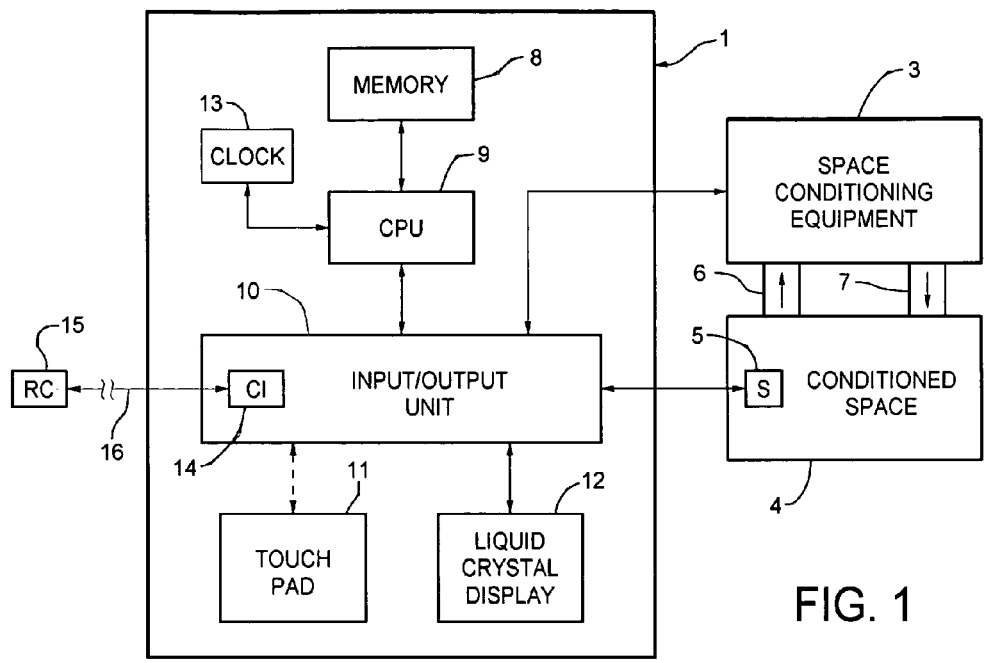
FIG. 1 is a block diagram of a first embodiment of a space conditioning system incorporating a thermostat system employing the present invention.

Referring first to FIG. 1, a thermostat system includes a processor 1 and a temperature sensor 5 which is disposed in a conditioned space 4. The processor 1 and the sensor 5 may be situated in a common housing (not shown) or separated, all as very well known in the art. The common housing is usually, but not necessarily, placed in the conditioned space 4. Thus, those skilled in the art will understand that the block diagram of FIG. 1 is very general in order to best explain the invention.

The processor 1 includes a central processing unit (CPU) 9 in communication with a memory 8 which stores data and program information and also, via an input/output unit (I/O unit) 10, a touch pad 11 and a liquid crystal display (LCD) 12. The liquid crystal display may optionally be backlit by any suitable means (not shown). The memory 8 may include a read-only part which is factory-programmed and a random-access part which stores data subject to change during operation. A settable real time clock 13 is used to keep time in the thermostat system to facilitate operations. The thermostat system may be suitably powered by a battery (not shown) and/or from equipment to which is connected. The I/O unit includes a communications interface 14 for coordinating communications between the CPU 9 and a remote correspondent 15. The communications interface 14 may be, for example, a conventional serial port.

Thus, in the usual manner during normal operation, the temperature sensor 5 sends an electrical signal (e.g., if the sensor 5 is a simple thermistor, a resistance value; several types of temperature sensors are widely used) representative of the temperature within the conditioned space 4 which the processor can compare against a previously entered set point to determine if control signals need to be sent to the space conditioning equipment 3. For example, if the temperature in the conditioned space 4 is found to be too low when operation is in the heating mode, the processor 1 signals the space conditioning equipment 3 circulate, through ducts 6, 7, air from/to the conditioned space 4 which is heated by the space conditioning equipment before return to the conditioned space. This heating phase continues until the sensor 5 indicates that the space is now too hot (or approaching too hot) with reference to the set point such that the processor 1 sends signal(s) to the space conditioning equipment 3 to cease the heating function, all as very well known in the art. In a cooling mode, a counterpart procedure is followed. Those skilled in the art will understand that the control process typically includes such refinements as anticipation, hysteresis accommodation, fan control, etc. which are acknowledged, but are not directly relevant to the invention.

It may be noted that integrated circuit chips including all the processor components with all the necessary interface conditioning circuits are available off-the-shelf and are under constant refinement for increased power. The subject invention only requires the capabilities of such a processor, and off-the-shelf integrated circuit processor chips may be used to advantage in the subject thermostat system.

Figure 5:
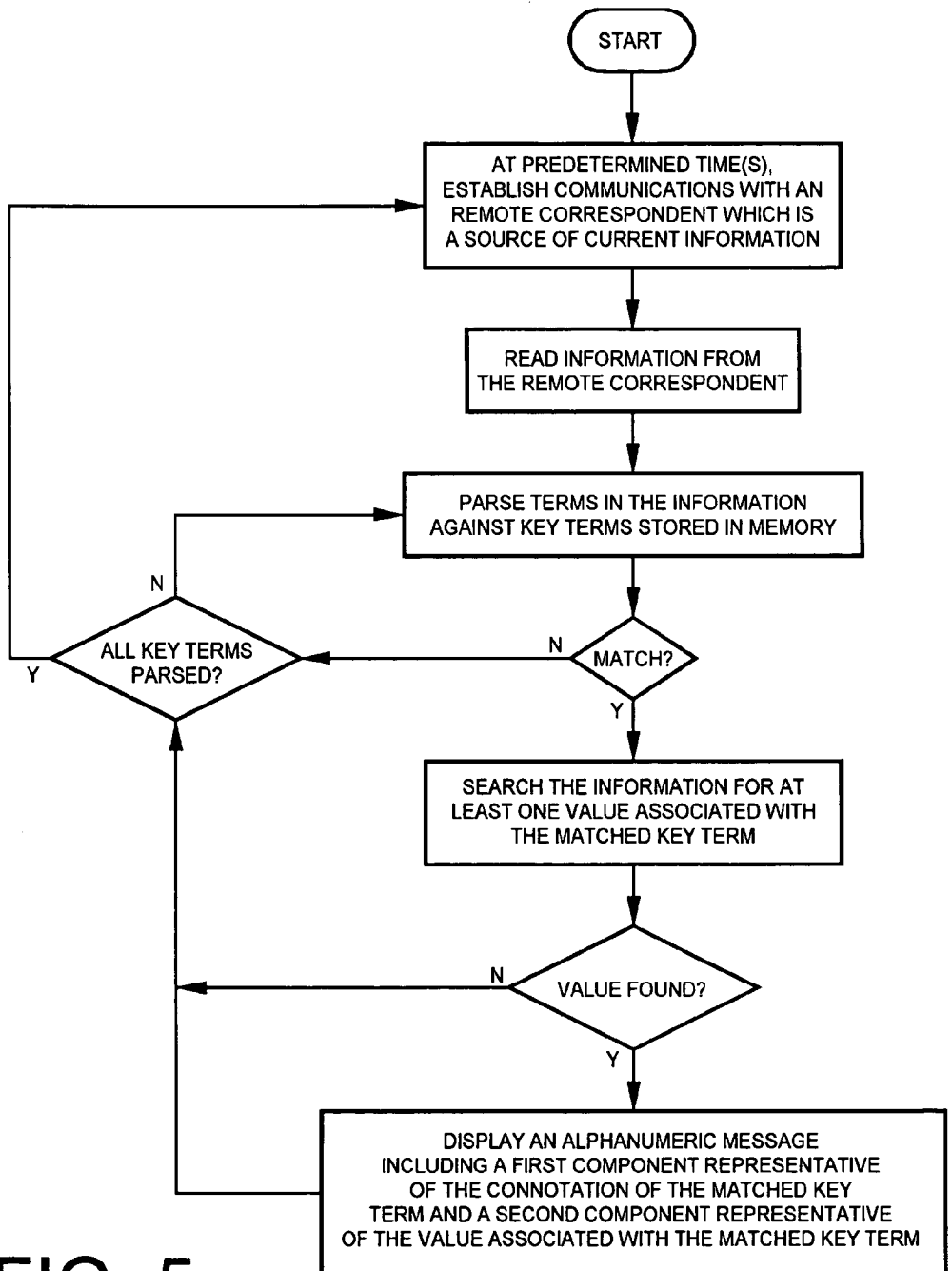
FIG. 5 is a high level process flow chart describing the operation of a method of obtaining diverse information from a remote correspondent.

Consider now a first embodiment of the invention. Referring to FIG. 5 as well as FIG. 1, there is stored in the memory 8 (typically, in ASCII format) a series of key terms pertaining to a subject of interest such as the local weather. Exemplary key terms for this subject may be "temperature", "relative humidity", "high", "low", "barometric pressure", etc. The key terms may be stored in the memory during the manufacturing process of the thermostat system or, as will be described below, by user entry using the touchpad 11 and LCD 12.

At one or more predetermined times of day (and/or on-demand if provided for in the operating program) which have been previously stored in the memory 8 and established by the clock 13, the CPU 9 starts the process shown in FIG. 5 by issuing signals to the I/O unit 10 to cause the communications interface 14 to establish communications, via link 16, with a remote correspondent 15. The remote correspondent 15 has a known data communications "address" and, in the example, is a source of current information, such as local weather. Such local current weather information sources are widely available and are routinely accessed by, for example, using the Internet.

When the current local weather information is transmitted from the remote correspondent 15 via link 16 to the communications interface 14 and thence to the CPU 9, the CPU parses the information against the key terms stored in memory 8 to determine if there is a match. This is easily achieved because the source code of the information will typically also be in ASCII format. If the CPU 9 senses a match, the just-received information is searched for the presence of at least one "value" associated with the matched key term. If such a value is found and under control of the CPU 9, a first alphanumeric message component representative of the connotation of the matched key term and a second alphanumeric message component representative of the value associated with the key term are displayed on the LCD 12.

If no value for the present matched term is found, but more key terms in the present set are yet to be compared to information just received from the remote correspondent 15, the same process is repeated until all the key terms in the present set have been parsed and alphanumeric messages, if generated, have been sent to the LCD 12. The immediate session then ends.

As an example, assume that Montreal weather is of interest to an occupant of a conditioned space in the Montreal area which uses the subject thermostat system and that "temperature", "high" and "low" are the key terms for the subject of local weather stored in the memory 8. Periodically, as determined by times stored in the memory 8, the CPU 9 issues signals to access the remote correspondent 15 (a site providing local Montreal weather in the example) and download the current weather information as a data stream. If the CPU finds, by examining and processing the data stream, that the term "temperature" has been received, it looks for the next characters in the data stream which can be a value associated with "temperature"; e.g., it may quickly find "+18° C.". With this coupling established, the CPU may access the memory 8 to read the prestored alphanumeric message component "Current Montreal Temperature:" and then concatenate, as a second alphanumeric message component, "18 C" and then send the complete message to the LCD 12 which displays: "CURRENT MONTREAL TEMPERATURE: 18° C.".

In a similar manner, if the key term "high" and an associated value are sensed, the exemplary message "MONTREAL HIGH TODAY: 26 C." may be displayed; and if the key term "low" and an associated value are sensed, the exemplary message "MONTREAL LOW TODAY: 9 C." may be displayed.

While an application for using the invention is acquiring and displaying current weather information, other types of current information may be obtained and displayed in a like manner. For example, current stock quotations for stock indexes and individual stocks, mutual funds and the like can be automatically acquired, displayed and periodically updated by suitably programming the processor 1 with the address of a site which maintains such information current along with the desired key terms which may, in this example, be NYSE, etc. stock symbols. Thus, the "value" term would be the current stock quote. As an example, if the key term "FMAGX" is matched and an associated value of 102.75 is also found, the alphanumeric message "CURRENT QUOTE FOR MAGELLAN: 102.75" is generated and displayed. To closely track one or more stocks or funds, the remote correspondent can be accessed as often as desired to "refresh" the alphanumeric message showing the current quote. A wide variety of types of information may be programmed, accessed and displayed in a like manner.

Figure 6:
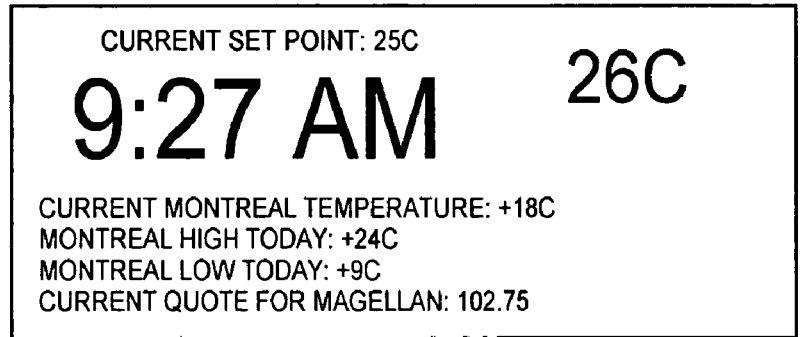
FIG. 6 is a pictorial of an exemplary display illustrating information presented to a user by the use of a method of obtaining diverse information from a remote correspondent.

It will be understood that the processor 1 can communicate successively or at different times with different remote correspondents. Thus, referring to FIG. 6, the current local weather information and the selected stock market information can be serially received and processed for display together in a manner which appears to be virtually simultaneous to a user. As previously noted, the overall display can be updated throughout the day at various times, as to each remote correspondent accessed, which have previously been entered in the memory 8.

If the thermostat system is programmable, the operating program installed during manufacture may provide for user entry following conventional instructions similar to those used in user-programming the climate control operation of the thermostat system. For example, assuming that the remote correspondent has an Internet address, the address may be entered using the touchpad 11 in any suitable manner as previously set up by a system programmer during software design. Then, various key terms the user wishes to employ with various remote correspondents having various addresses may be entered by a user.

Figure 7:
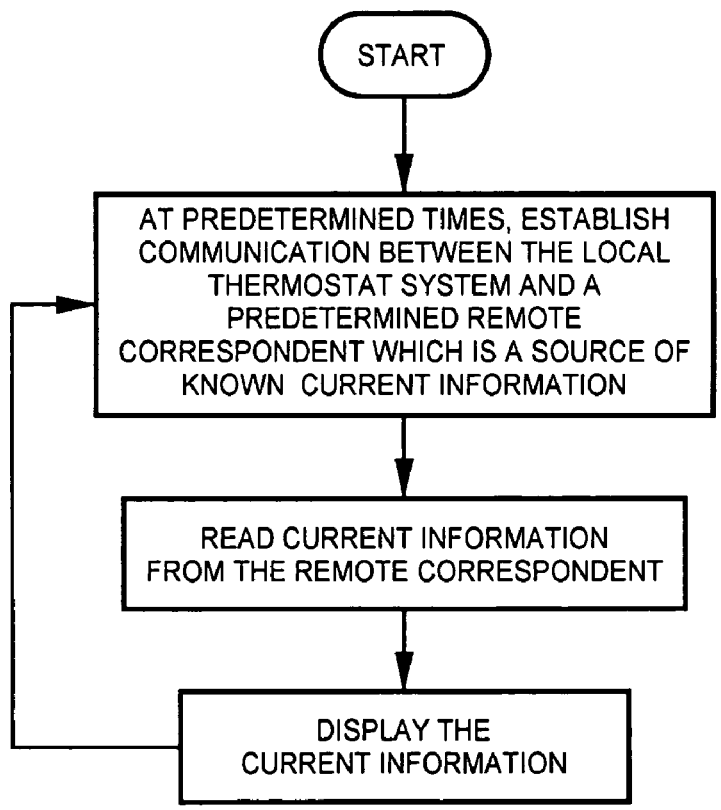
FIG. 7 is a high level flow chart describing the operation of a another method of obtaining diverse information from a remote correspondent.

As previously mentioned, the invention is not limited to use in programmable thermostat systems or even to thermostat systems in which correspondent addresses and key terms have previously been entered into memory 8. Still referring to FIG. 1 and also to FIG. 7, in a variant embodiment of the invention, a thermostat system communicates with a remote correspondent 15 which provides a customized service to the user of the thermostat system. In this embodiment of the invention, the user is a subscriber to the customized service in order to receive known current information on a predetermined schedule. At predetermined times (or on demand), data communications is established between the processor 1 and the remote correspondent 15 which, in this case, provides the customized service. The current information is downloaded and displayed. The resulting messages shown and periodically updated on the LCD 12 may be as shown in exemplary FIG. 6 if, for example, Montreal current temperature, daily high and low temperatures and the current quote for Magellan is what the user has subscribed to receive.

When the service is set up, the user and the business which provides the service via the remote correspondent 15 agree as to what current information (typically more than in the example) will be supplied on an agreed schedule. Depending upon the server-client relationship, either the processor 1 or the remote correspondent 15 may institute the current information transfer at the predetermined times or on demand.

Figure 2:
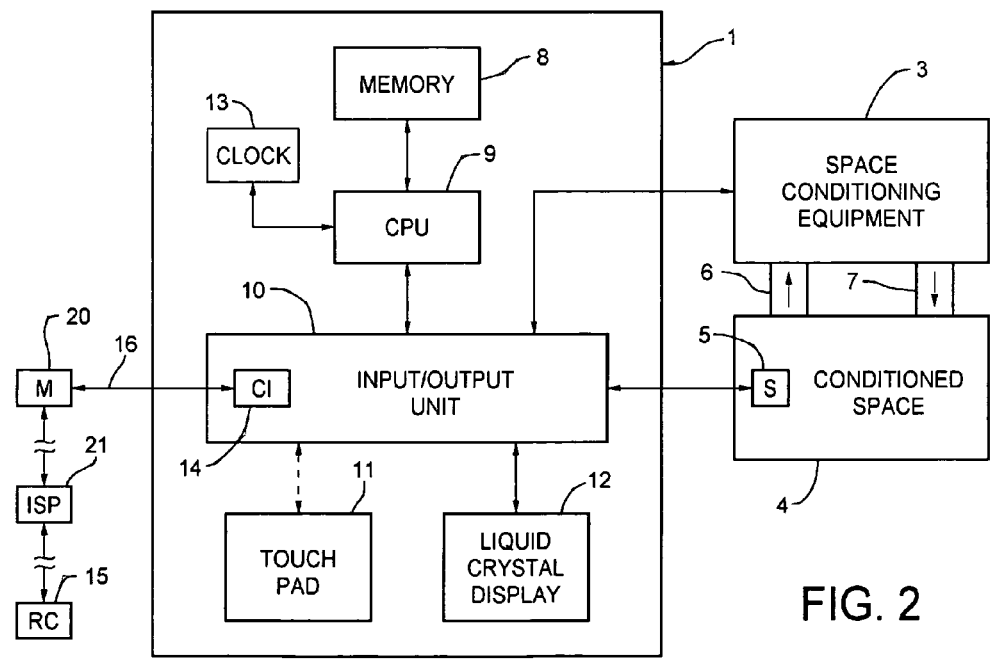
FIG. 2 is a block diagram of a second embodiment of a space conditioning system incorporating a thermostat system employing the present invention.

While the Internet is not the only facility which the subject thermostat system may use to communicate with a remote correspondent, it is, at the state-of-the-art the most readily widely available and easily accessible. Thus, FIG. 2 show a typical coupling in which the communications interface 14 sends/receives serial data to/from an external (to the thermostat system) modem 20 via serial link 16. The modem conventionally interfaces with an Internet Service Provider (ISP) 21 which completes the communications link to the remote correspondent in the well-known manner. The modem 20 may be dial-up, cable, DSL or any other type suitable for the communications environment in a given installation.

Figure 3:
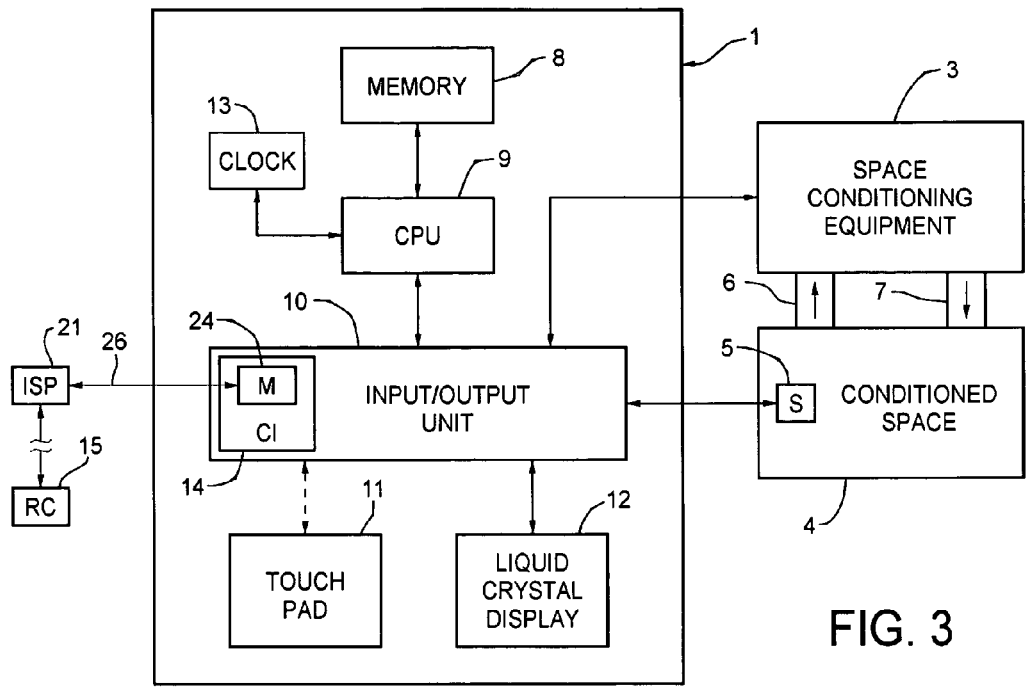
FIG. 3 is a block diagram of a third embodiment of a space conditioning system incorporating a thermostat system employing the present invention.

At the state-of-the-art and as shown in FIG. 3, a modem 24 for communicating with the ISP 21 may be integrated into the communications interface 14 of the input/output unit 14 to eliminate the need for an external modem. Thus, when communications is established with the remote correspondent 15 according to a schedule or upon demand, the data transfer takes place via modem 24 and data link 26 as shown.

Figure 4:
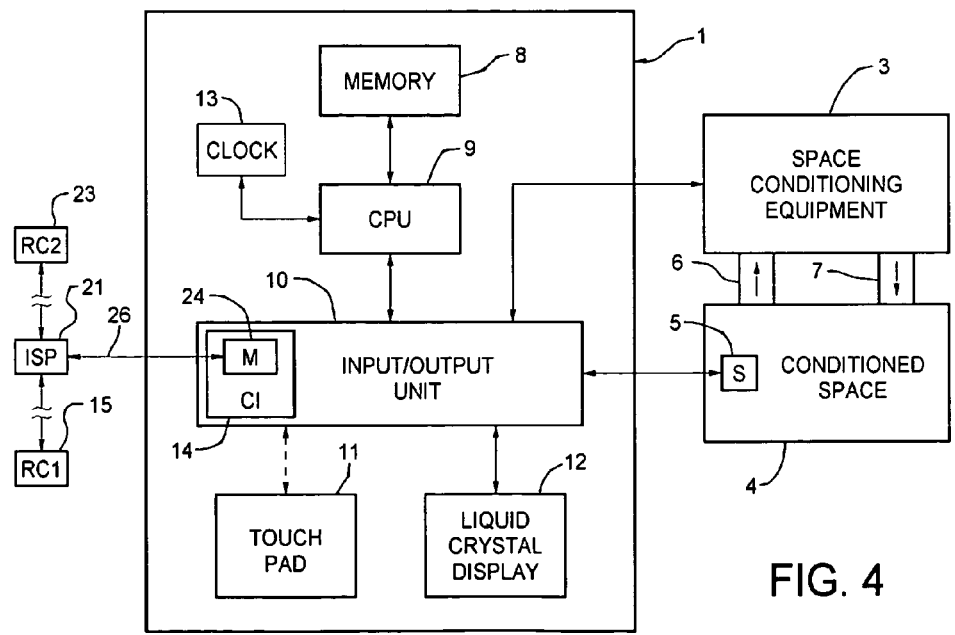
FIG. 4 is a block diagram of a first embodiment of a space conditioning system incorporating a thermostat system employing the present invention.

Attention is now directed to FIG. 4 which illustrates an optional extension of the subject thermostat system. It will be observed that the ISP 21 is not only in communication with the first remote correspondent 15, but also with a second remote correspondent 26. The second remote correspondent 23 may be another thermostat system (controlling another conditioned space (not shown) with other space conditioning equipment (not shown)) which can be remotely controlled. In this embodiment, data received from the first remote correspondent 15 as previously described may include specific information which can be interpreted by the processor 1 to require action at the site of the second remote correspondent 23. As an example, assume that the site of the second remote correspondent 23 is a temporarily unoccupied dwelling and that weather data received by the subject thermostat system indicates a predicted significantly low temperature predicted for the region of the site of the second remote correspondent 23. The processor 1 may determine, in response to this new weather information supplied by the first remote correspondent 15, that the heat should be turned on (or the set point raised) at the site of the second remote correspondent 23 in order to protect water pipes against freezing, warm the conditioned space controlled by the second remote correspondent in anticipation of its upcoming occupation, etc.

Figure 8:
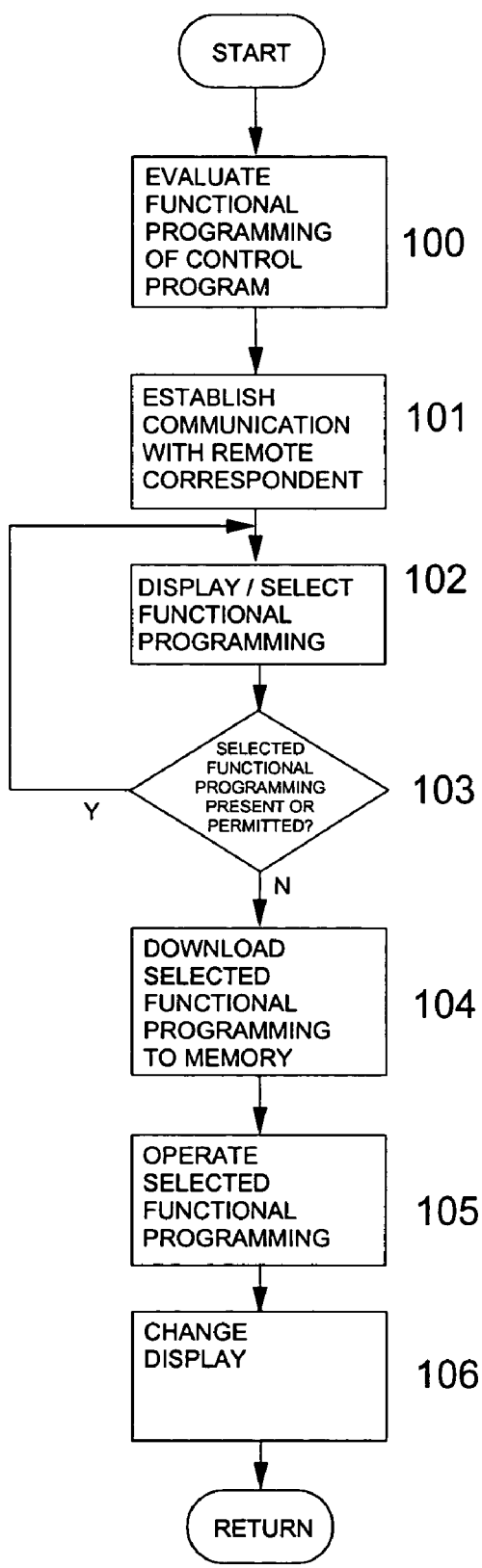
FIG. 8 is a high level flow chart describing the operation of the invention obtaining and incorporating functional programming with a control program.

Consider now a functional programming embodiment of the invention. Referring to FIG. 8 as well as FIG. 1, there is stored in the memory 8 a control program enabling functions of the programmable thermostat of the invention. At step 100, the control program determines what functions are enabled by the control program and associates with each of the functions a designation such as "control of compressor and condenser type air conditioner", "control of fan", "screen #1" (for a certain display on LCD 12 as in FIG. 9), etc. Said functions include at least control of touch pad 11 and LCD 12 as to representations and legends for virtual buttons as well as text and graphic devices viewable on the LCD 12. In addition, at step 100 the control program establishes what space conditioning equipment, control options, sensors, and other features are available for operation within the HVAC system controlled by the thermostat system of the invention.

At the election of a user locally at touch pad 11 as provided for by the control program or via other communication with a remote correspondent such as with removable media, infrared link, by personal computer to an Internet website permitting such action, etc., the CPU 9 at step 101 shown in FIG. 5 communicates signals to the I/O unit 10 to facilitate the communications interface 14 to establish communications, via link 16, with a remote correspondent 15. The initiation and maintenance of these communications may occur in reverse of these steps. The remote correspondent 15 has a known data communications "address" and, in the example, is a source of functional programming. At step 102, a user is shown functional programming available for transfer to the programmable thermostat system and a user selects at least one of such functional programming selections.

At step 105, the selected functional programming is transferred and becomes part of the control program. At step 106, the selected functional programming cause a change in the touch pad 11 and/or LCD 12 as appropriate for the current screen display requirements.

Figure 9:
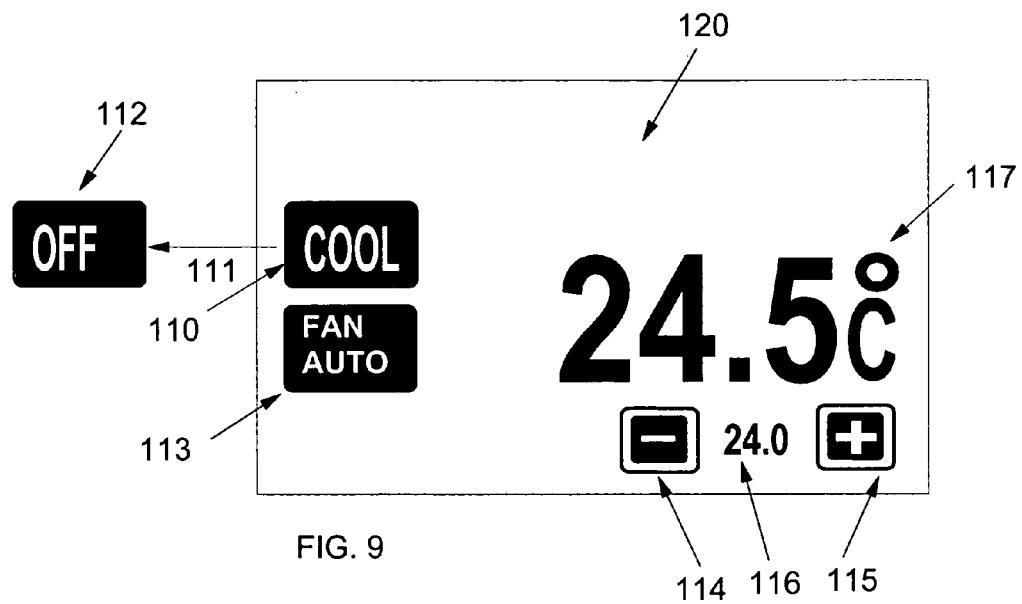
FIG. 9 is an exemplary pictorial of a first interactive interface display on the touch screen of the devices of FIGS. 1 through 4 having a control program adapted only to control space conditioning equipment for cooling and activation of a fan of an air handler.
Figure 10:
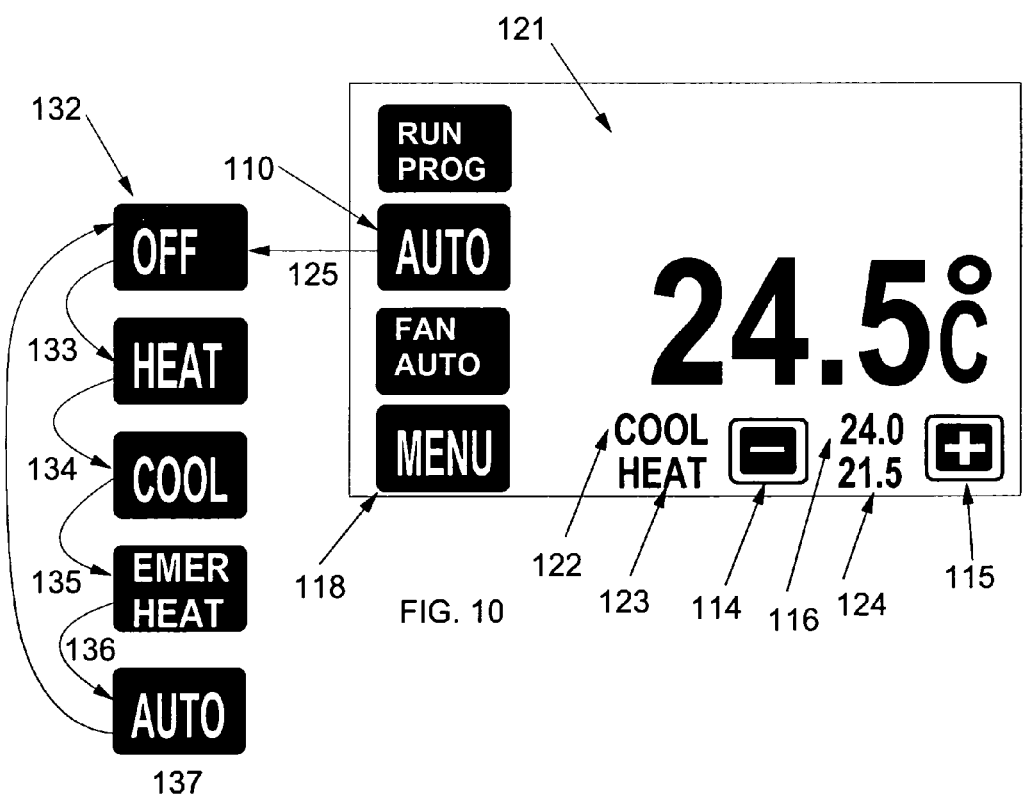
FIG. 10 is an exemplary pictorial of a second level interactive interface display on the touch screen in FIG. 9 after functional programming has been obtained from a remote correspondent and the control program has incorporated and operated said functional programming.

FIGS. 9 to 11 show pictorial representations of the touch pad 11 and LCD of FIG. 1 in various interactive conditions. FIG. 9 is a representation of a thermostat system at step 100 of FIG. 8 with a current set of functional programming modules in a control program. FIGS. 10 and 11 are representations of a thermostat system at step 106 of FIG. 8 with a newly obtained set of several functional programming modules incorporated in the control program causing changes and additions to be indicated on touch pad 11 and LCD 12.

Referring again to FIG. 9, pictorial 120 comprises a set of virtual buttons 110, 113, 114 and 115 which in response to a user touch also causes a change in the operating state of the invention programmable thermostat. Such of button 110 results in a change of the legend associated with virtual button 110 from COOL to OFF as in button 112, indicating that an air conditioning mode has been turned off and no space conditioning equipment will activated if the sensed temperature 117 of the conditioned space exceeds the cooling setpoint 116. Setpoint 116 can be increased by pressing button 115 and decreased by pressing button 114. A fan operation mode is activated or turned off by pressing button 113. The programmable thermostat whose user interface is represented in FIG. 9 is a simple device capable of turning on or off space conditioning equipment at a desired setpoint for cooling or to turn a fan on or off. Its control program does not include more advanced functions, although the programmable thermostat is preferably provided with sufficient circuitry, relays, switches and the like to accomplish the objects of upgrade of equipment and control options as described herein.

Without specifically limiting such a definition, functional programming transferred to the memory of the programmable thermostat and previously unavailable to the control program includes:

(a) one or more entire graphical user interfaces as represented on a touchscreen;

(b) portions of a graphical user interface;

(c) representations of the size, shape, colors, legends, locations, and other viewable aspects of virtual buttons on the touchscreen;

(d) representations of the size, shape, colors, locations and other viewable aspects of text or graphic devices on the touchscreen;

(e) operational algorithms for the control program other than those for the graphical user interface;

(f) operational algorithms for control of existing or newly installed space conditioning equipment;

(g) operational algorithms for communications with existing or newly installed environmental sensors;

(h) means for changing one or more functions to be associated with the determination that a virtual button on the touchscreen has been touched or that said button has not been touched; and (i) means for establishing and/or controlling communication with a remote correspondent, such as, obtaining transfer of functional programming from new sources (such as from removable media, through an infrared link, or from a communication initiated by the remote correspondent), communication sessions initiated periodically by the control program to obtain new functional programming, establishing password protection against unauthorized transfer of function programming to the thermostat, and establishing communication with computer networks (such as the Internet or an internal network).

Functional programming transferred to the thermostat according to the invention does not include data-only transfers.

Referring to FIG. 10, several functional programming modules have been transferred to the programmable thermostat. As a specific example and without limiting the invention in any way, some of the transferred functional programming modules are now described. A cooling mode indicator text 122 and heating mode indicator text 123 are shown with associated setpoints 116 and 124. The control program has been changed to enable operation of simple to complex control of space conditioning equipment for heating the conditioned space. Virtual button 110 can undergo step 111 in response to a user touch which also causes a change in the operating state of the invention programmable thermostat and a change of the legend associated with virtual button 110 to one of the virtual buttons in column 132. In the example, successive steps 133 to 137 indicate that a user has touched virtual button 110 one or more times to cause the operating state of the programmable thermostat and the legend of virtual button 110 to change with respect to those steps as follows:

A) at step 137, from "automatic" mode to "off" mode (none of the environmental control equipment connected with the thermostat will operate, and virtual button 110 shows "OFF");

B) at step 133, from "off" mode to "heat" mode (a heater or a heat pump in heat mode operates to heat the conditioned space, and virtual button 110 shows "HEAT");

C) at step 134, from "heat" mode to "cool" mode (an air conditioner or heat pump operating in the cooling mode operates to cool the conditioned space, and virtual button 116 shows "COOL");

D) at step 135, from "cool" mode to "emergency heat" mode (a backup electric heater operates to keep the conditioned space temperature above a lowest set point, and virtual button 110 shows "EMER HEAT"); and E) at step 136, from "emergency heat" mode to "automatic" mode (the air conditioner and heater (or heat pump) operates in both the "heat" and "cool" mode, and virtual button 110 shows "AUTO").

It will be appreciated that the virtual buttons of virtual buttons column 132 may alternatively be reduced in size and distributed on the surface of pictorial 121 instead of being a set of virtual buttons activated and serially viewable by invoking steps 133-137. If the virtual buttons of virtual buttons column 132 are distributed as separately and simultaneously viewable virtual buttons, it is desirable that the virtual button for the function currently activated for the thermostat will "flash" in contrast as described above so that the user will know which of the operating states or conditions are currently controlled by the thermostat.

However, it is an important feature of the thermostat that, although a user may touch virtual button 110, fewer or more than all the virtual buttons of column 132, in the example, and their associated changes in the normal operation control effected by the thermostat may be available to a user. The user has the ability to "edit" and/or simplify the virtual buttons column 132 to reflect the user's environmental control equipment actually connected for control by the thermostat.

If fewer than or more than the virtual buttons of virtual buttons column 132 are available to the user, appropriate fewer or more touching steps will be required to cycle through the functions of the thermostat and the corresponding legends which may appear with virtual button 110. The particular sequence of thermostat functions available at steps 133 to 137 is only exemplary of how normal user changes between operating states or conditions are made for the thermostat; the virtual buttons of column 132 may, of course, have a different sequence and also reflect various space conditioning equipment components which may be installed in diverse applications.

Thus, as more fully described below, a user is able, typically during a system setup, to eliminate or add to the virtual buttons shown in column 132 (and their associated functions) by using the touch screen in a manner that allows the user to specify what environmental control equipment components are actually controlled by the thermostat and, accordingly, included in column 132.

In practice, the thermostat manufacturer provides, in the control program, control sequences for as many different types of space conditioning components as might be used in widely diverse applications, alone or in combination. During setup, the user of a given installation eliminates those components, and graphics displays related thereto, which are irrelevant to the given installation, thus simplifying later ongoing programming and use of the thermostat. This system setup procedure is instituted by touching the "MENU" button 118 shown in FIG. 10 which the control program responds to by displaying second-level pictorial 140 of FIG. 11 on the touch screen.

FIG. 11 shows that pictorial 140 displays virtual buttons 141 to 149. Touching each of buttons 141 to 149 results in a new, usually third level, pictorial screen to show information and/or new buttons as follows:

A) for "home" icon button 141, a return to the first level, normal operation, pictorial 113 shown in FIG. 9;

B) for "DATE/TIME SETTINGS" button 142, for entering current date and time information;

C) for "SET SCREEN" button 145, for changing screen settings for the touch screen;

D) for "CLEAN SCREEN" button 146 to wipe the screen, e.g., with a lightly dampened cloth, without accidentally changing any of the settings; this function times out after a few seconds;

E) for button "FILTER MONITOR" button 147, entering, for display at pictorial 113 or similar touch screen, a reminder to change or clean filters on a specified schedule;

F) for "VACATION SETTINGS" button 148, for entering appropriate vacation system settings;

G) for "PROGRAM SETTINGS" button 143, for entering automatic temperature set point adjustments, typically for each of four selectable times for each day of the week;

H) for "ENERGY WATCH" button 144, for display of ongoing energy consumption and costs as discussed further below; and I) for "ADVANCED SETTINGS" button 149, for entering the environmental control equipment connected with the thermostat, entering energy consumption data and costs and other functions as described.

Touching virtual button 149 results in display of pictorial 150 of FIG. 12. In a manner similar to button 116 of FIG. 9, buttons 154 and 158 of FIG. 12 each represents a sequence of buttons that change after being touched by a user. Button 154 represents the presence or absence of air conditioning equipment connected with the thermostat. Button 158 represents the presence or absence of heating equipment connected with the thermostat.

More particularly, the virtual buttons in column 163 are those that become successively visible when a user successively touches button 154, also indicating a change in the designation of which cooling equipment is present in a given system. Similarly, in the example, buttons in column 164 are those that become successively visible when a user successively touches button 158, also indicating a change in the designation of which heating equipment is present in the given system.

In the example, invoking steps 160, 161 and 162 respectively cause a change in the function and legend appearing at button 154 from "heat pump" mode to "air conditioner" mode, from "air conditioner" mode to "no compressor" mode (no air conditioning equipment), and from "no compressor" mode to "heat pump" mode. The memory program contains programming adapted to cause effective operation of a heat pump or compressor type air conditioner depending on the one selected at button 154. If the "no compressor" mode is selected at button 154, the buttons column 132 of FIG. 10 will lack the "cool" and "auto" buttons and functions.

Cycling through steps 165, 166, 167, 168 and 169 respectively cause a change in the function and legend at button 158 from "electric furnace" mode (presence in the given system of an electric powered furnace) to "emer. elect. furnace" mode (additional presence of an emergency electric furnace), from "emer. elect. furnace" mode to "gas furnace" mode (presence of a gas furnace), from "gas furnace" mode to "oil furnace" mode (presence of an oil furnace), from "oil furnace" mode to "furnace off" mode (lack of heating equipment) and from "furnace off" mode to "electric furnace" mode. If the "furnace off" mode is selected at button 158, the buttons column 132 of FIG. 10 will lack the "heat" and "emer heat" mode buttons and functions as well as the "auto" mode button and function. The control program stored in memory contains routines adapted to cause effective operation of any combination of the designated equipment.

Pictorial 155 of FIG. 12 also shows virtual button 151 for changing the temperature designation in the touch screen from Centigrade to Fahrenheit, buttons 153 and 157 for entering certain set point related parameters, button 155 for entering an installer message and button 146 for entering security settings.

The functional programming modules operating in the control program to effect the functions shown and described in FIGS. 10 to 12 are several and yet are only a few of those capable being implemented for the touch pad 11 and LCD 12 of the invention programmable thermostat. As described above, transferable functional programming from a remote correspondent may create virtual buttons numbering from one to many within the viewable LCD 12 and have different sizes, shapes, legends, icons, or even animations depending on a particular user interface desired and provide a succession of pictorials to accommodate the functions of the user interface. A basic thermostat according to the invention may be purchased with very little functionality as long as it can accomplish communication with a remote correspondent to obtain what may be needed after an initial installation.

Those skilled in the art will appreciate that, in a large facility incorporating subdivisions in the conditioned space, each conditioned space having its own thermostat system, each of the thermostat systems may independently employ the invention as previously described.

What is claimed is:

1. A thermostat system for controlling space conditioning equipment comprising:
   A) a temperature sensor for providing an electrical signal indicative of the temperature of a conditioned space in which the temperature sensor is situated;
   B) a transparent touch pad juxtaposed over a liquid crystal display to constitute a touch screen for interactive interface with a user and for selectively displaying alphanumeric and graphic devices;
   C) a processor, said processor including:
      1) a central processing unit;
      2) a real time clock;
      3) a memory coupled to said central processing unit for storing program and data information; and
      4) an input/output unit including:
         a) a sensor input coupled to said temperature sensor for receiving said electrical signal therefrom;
         b) a control output coupled to the space conditioning equipment for issuing control signals thereto; and
         c) a communications interface adapted to establish communications between said processor and a first remote correspondent which is a source of functional programming; and
   D) a control program stored in said memory for causing said central processing unit to selectively:
      1) establish on said liquid crystal display one or more representations of buttons at a separated and predetermined positions;
      2) read the position on the touch pad juxtaposed with said predetermined position to determine if said representation of a button has been touched; and
      3) if said a representation of a button has been touched, processing this information to establish a condition incorporated into the operation of said thermostat system;
      4) establish communications between said processor and a first remote correspondent from which is transferred to said memory one or more modules of functional programming; and
      5) operate said transferred functional programming to change or add to representations on the touch screen, where said changes or additions of representation on the touch screen were not available to the control program before their transfer to the memory;
   E) means coupling said communications interface and said first remote correspondent.

2. The system of claim 1 in which in which said communications interface includes a modem.

3. The system of claim 1 in which said communications interface is coupled to an external modem.

4. The system of claim 1 in which transferred functional programming modules comprise means for controlling space conditioning equipment.

5. The system of claim 1 in which transferred functional programming modules comprise means for controlling space conditioning equipment and providing representations of buttons on the touch screen to provide a user with an interface as part of those means.

6. The system of claim 1 in which in which transferred functional programming modules comprise means for causing successive and substantially different pictorial representations on the touch screen.

7. The system of claim 1 in which in which transferred functional programming modules comprise menus for selecting functional options for the control program.

8. The system of claim 1 in which transferred functional programming modules comprise means for adding space conditioning equipment to that equipment controlled by the thermostat.

9. The system of claim 1 in which in which said first remote correspondent is a network node.

10. The system of claim 1 in which in which said first remote correspondent is removable media.

11. The system of claim 1 in which in which said functional programming determines all or part of a graphical user interface.

12. The system of claim 1 in which in which said functional programming determines size, shape, colors, legends, locations, or other viewable aspects of said buttons on the display.

13. The system of claim 1 in which in which said functional programming determines representations of the size, shape, colors, locations and other viewable aspects of text or graphic devices on the display.

14. The system of claim 1 in which in which said functional programming determines operational algorithms other than those for the graphical user interface.

15. The system of claim 1 in which in which said functional programming determines operational algorithms for control of existing or newly installed space conditioning equipment.

16. The system of claim 1 in which in which said functional programming determines operational algorithms for communications with existing or newly installed environmental sensors.

17. The system of claim 1 in which in which said functional programming includes means for changing one or more functions to be associated with the determination that a virtual button on the touchscreen has been touched or that said button has not been touched.

18. The system of claim 1 in which in which said functional programming includes means for establishing or controlling communication with a remote correspondent.

19. The system of claim 1 in which in which said functional programming determines color of all or part of a graphical user interface.

20. The system of claim 1 in which in which said functional programming controls periodically changing color of all or part of a graphical user interface.

* * * * *